US006829701B2

(12) United States Patent
Roth et al.

(10) Patent No.: US 6,829,701 B2
(45) Date of Patent: Dec. 7, 2004

(54) WATCHPOINT ENGINE FOR A PIPELINED PROCESSOR

(75) Inventors: Charles P. Roth, Austin, TX (US);
Ravi P. Singh, Austin, TX (US);
Gregory A. Overkamp, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 569 days.

(21) Appl. No.: 09/739,092

(22) Filed: Dec. 15, 2000

(65) Prior Publication Data

US 2002/0078329 A1 Jun. 20, 2002

(51) Int. Cl.[7] .............................. G06F 9/44; G06F 11/30; G06F 11/277
(52) U.S. Cl. ........................ 712/227; 712/219; 714/34; 714/39
(58) Field of Search ................................. 712/219, 215, 712/227, 244, 245, 207; 714/34, 39, 38; 703/26, 27, 28

(56) References Cited

U.S. PATENT DOCUMENTS

| 5,371,894 A | | 12/1994 | DiBrino ...................... 714/34 |
| 5,644,742 A | * | 7/1997 | Shen et al. .................. 712/244 |
| 6,349,371 B1 | * | 2/2002 | Ramanadin et al. ........ 711/151 |
| 6,477,683 B1 | * | 11/2002 | Killian et al. .................. 716/1 |
| 6,557,119 B1 | * | 4/2003 | Edwards et al. .............. 714/38 |

FOREIGN PATENT DOCUMENTS

EP     0 992 905     4/2000

OTHER PUBLICATIONS

"Internal instruction frequency monitoring", IBM Technical Disclosure Bulletin, IBM Corp., 35(1B):246–248, Jun. 1992 (XP000309047).

* cited by examiner

Primary Examiner—Daniel H. Pan
(74) Attorney, Agent, or Firm—Fish & Richardson P.C.

(57) ABSTRACT

In one embodiment, a watchpoint engine generates watchpoints for code developed for a complex integrated circuit device such as a pipelined processor.

8 Claims, 6 Drawing Sheets

WATCHPOINT ENGINE FOR A PIPELINED PROCESSOR

BACKGROUND

This invention relates to generation of watchpoints for a pipelined processor.

Code developed for complex integrated circuit devices such as pipelined processors typically requires extensive debugging. It is helpful to generate watchpoints that monitor the propagation of instructions through the processor pipeline. For this reason, a watchpoint engine can be provided to extract state information from the processor pipeline and provide the state information to a control unit for event handling. In this manner, application developers can verify proper code operation and thereby debug code developed for the processor.

DESCRIPTION

Figure 1:
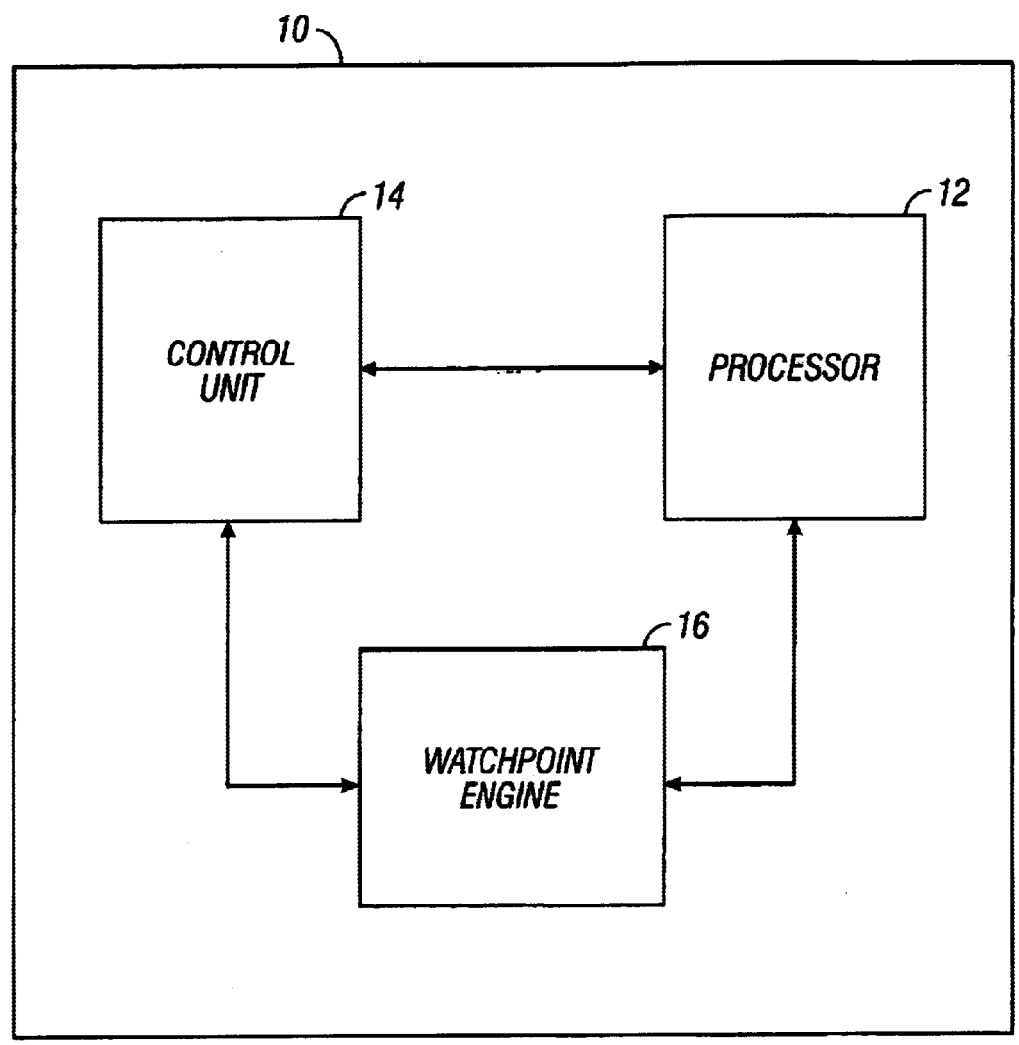
FIG. 1 is a block diagram illustrating an integrated circuit with a pipelined processor and a watchpoint engine.

FIG. 1 is a block diagram illustrating an integrated circuit device 10. As shown in FIG. 1, integrated circuit device 10 may include a programmable processor 12, a processor control unit 14, and a watchpoint engine 16. Processor 12 may execute instructions in a random access memory (RAM) device such as a flash memory device. Processor 12 may be a pipelined processor with multiple execution stages. Watchpoint engine 16 extracts state information from processor 12 in real time and processes the information to notify control unit 14 of events such as exceptions and interrupts.

Watchpoint engine 16 may be adapted to match on addresses of data or instructions, as well as inclusive or exclusive ranges of addresses, i.e., combinatorial matches. Also, watchpoint engine 16 may be adapted to track the propagation of watchpoint address matches through successive execution stages of pipelined processor 12. To that end, watchpoint engine 16 may include appropriate registers and logic arranged to support those functions. The registers may be implemented as flip-flops or latches. In addition, watchpoint engine 16 may be arranged to generate watchpoints for high frequency operation of processor 12 in real time.

Modular sections of watchpoint engine 16 may be independently enabled and disabled for different functions, aiding in power conservation. Watchpoint engine 16 may be particularly useful for integrated circuit devices embedded in handheld or other portable battery-powered devices in which power conservation is a concern. Thus, in some embodiments, watchpoint engine 16 may combine the advantages of real time response, high frequency operation, and reduced power consumption.

Generation of precise watchpoint matches for instructions and data facilitates debugging and enables code patching. The propagation of instructions through a processor pipeline can be monitored in real-time to identify emulation and exception events and provide emulation mode operation or exception handling, as appropriate. Watchpoint matches may be identified several cycles before the pertinent instructions are committed. Importantly, handling of exceptions can occur with speed and precision, enabling instructions to be killed, i.e., terminated, when they reach the writeback stage. This feature facilitates code patching. Thus, the ability to provide high-frequency, real-time watchpoint matching may provide significant advantages to code developers.

Figure 2:
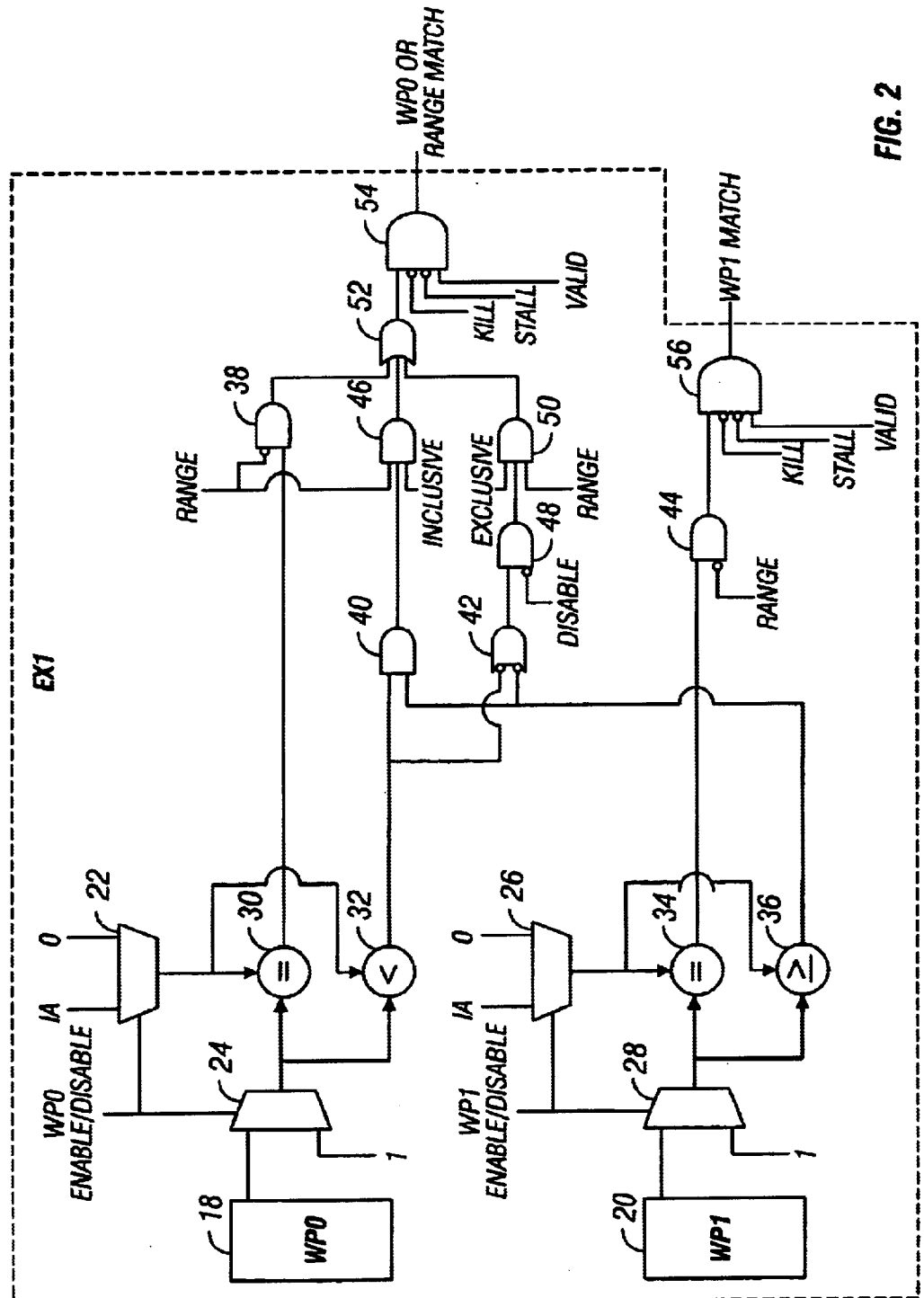
FIG. 2 is a circuit diagram illustrating circuitry suitable for implementation of a watchpoint engine.

FIG. 2 is a block diagram illustrating circuitry suitable for implementation of watchpoint engine 16. As shown in FIG. 2, watchpoint engine 16 may include one or more watchpoint registers 18, 20. Watchpoint register 18 is designated "WP0" while watchpoint register 20 is designated "WP1." Watchpoint registers 18, 20 may be memory mapped registers that are programmed by a code developer with a desired watchpoint address for debugging purposes. In FIG. 2, watchpoint registers 18, 20 are represented by flip-flops. In one embodiment, watchpoint engine 16 may include six watchpoint registers that enable matching on multiple instruction and data addresses and multiple address ranges.

A watchpoint status register (not shown) records watchpoint matches. A watchpoint instruction address control register and a watchpoint data address control register (not shown) specify whether particular watchpoint matches should generate emulation events or exception events. Code patching, or replacing old code, may be done by writing the start address of the old code to one of the watchpoint registers, and setting a corresponding bit in one of the control registers to trigger an exception. In the exception service routine, the status register is read. In general, when an instruction hits writeback, it is killed. At that point, the exception routine causes a jump to an instruction at another location. Instructions at that location are executed. Then, the program returns to the instruction just after the instruction that was killed in writeback. Thus, new code is executed in lieu of the killed instruction, providing a code patch.

Watchpoint registers 18, 20 may be loaded with either direct match watchpoints or range bound watchpoints. A direct match watchpoint is a memory address for an instruction or data on which watchpoint engine 16 generates a watchpoint match. A range bound watchpoint is a memory address for an instruction or data defining one of the bounds for a range of addresses on which watchpoint engine 16 provides a watchpoint match.

For direct matches, watchpoint addresses are loaded in a watchpoint register 18, 20 on an independent basis. For a range match, both of the watchpoint addresses loaded in watchpoint register 18 and watchpoint register 20, which together define a range of addresses for matching are used. The direct and range bound watchpoint addresses can be programmed into watchpoint registers 18, 20 as desired.

Watchpoint engine 16 also may include multiplexers 22, 24, 26, 28, and comparators 30, 32, 34, 36. Multiplexers 22, 26 select either a current instruction or data address provided, or a "0," which generally will be a multi-bit value. The address is shown in FIG. 2 as an instruction address (IA) provided by a program counter for purposes of example. The address in FIG. 1 is local to an execution stage, e.g., EX1. Multiplexers 24, 28 select either the watchpoint address loaded into the respective watchpoint register 18, 20, or a "1" or other nonzero value, which generally will be a multi-bit value. The outputs of multiplexers 22, 24 are applied to comparators 30, 32. Similarly, the outputs of multiplexers 26, 28 are applied to comparators 34, 36. In each case, the respective comparator 30, 32, 34, 36 compares the output of one multiplexer 22, 26 to the output of the other multiplexer 24, 28.

Multiplexers 22, 24, 26, 28 are provided to stabilize the comparator circuitry in the event one or both of watchpoint registers 18, 20 is disabled for power conservation. In the event only a single direct-match watchpoint is monitored, for example, one of watchpoint registers 18, 20 may be disabled. This is highly advantageous from the standpoint of power conservation, especially for battery-powered devices. In particular, part or all of watchpoint engine 16 may be selectively disabled when it is not needed, avoiding excessive power consumption. If watchpoint monitoring is not needed, a global enable bit can be reset to disable all flip-flops and latches associated with the watchpoint circuitry.

A WP0 Enable/Disable control line may be coupled to both multiplexers 22, 24. A WP1 Enable/Disable control line may be coupled to both multiplexers 26, 28. If watchpoint register 18 is not enabled, multiplexers 22, 24 receive the WP0 Disable signal, and propagate a multibit "0" and "1," respectively, to comparators 30, 32. If not, comparators 30, 32 receive the instruction address (IA) and the respective watchpoint address for comparison. Again, an instruction address is referenced for purposes of example. In other examples, the address could be a data address. Multiplexers 26, 28 work in a similar manner in response to the WP1 Disable signal in the event watchpoint register 20 is disabled. If comparators 30, 32, 34, 46 do not toggle, most of the remainder of the downstream logic coupled to the comparators also does not operate, resulting in significant savings in power consumption.

In normal operation, comparators 30, 34 monitor direct matches between watchpoint addresses in watchpoint registers 18, 20, respectively, and the current address provided via multiplexers 22, 26. In other words, comparators 30, 34 determine whether the watchpoint addresses and instruction addresses are equal to one another. If the watchpoint address from register 18 equals the instruction address, comparator 30 propagates a multibit "1" to additional watchpoint logic circuitry that forms part of a watchpoint match generator. Comparator 34 operates in a similar fashion.

Comparator 32 determines whether the watchpoint address in register 18 is less than the instruction address. In this case, the watchpoint address in register 18 may be used as a lower bound address for a range match. Comparator 36 determines whether the watchpoint address in register 20 is greater than or equal to the instruction address. In this case, the watchpoint address in register 20 may be used as the upper bound address for a range match. If there is a watchpoint match at each comparator 32, 36, then the instruction address is in the range specified by registers 18, 20. In this case, comparators 32, 36 propagate a "1" to additional logic circuitry.

In the illustrated embodiment, the output of comparator 30 is coupled to an AND gate 38, while the output of comparator 32 is coupled to an AND gate 40 and an inverted input of an OR gate 42. The output of comparator 34 is coupled to an AND gate 44, while the output of comparator 36 is coupled to AND gate 40 and an inverted input of OR gate 42. AND gates 38, 44 have inverted inputs that receive a RANGE enable signal. In effect, AND gates 38, 44 propagate a "1" if comparators 30, 34 indicated a direct watchpoint address match and watchpoint engine 16 is not operating in a range mode, i.e., AND gates 38, 44 receive "NOT RANGE."

The output of AND gate 40 feeds another AND gate 46 that determines whether the instruction address is within an inclusive range defined by range bound watchpoints loaded in watchpoint registers 18, 20. AND gate 46 receives as inputs the output of AND gate 40, a range enable signal signifying that watchpoint engine 16 is in range mode, and an inclusive signal indicating that the range mode is inclusive, i.e., the watchpoint engine matches on addresses between the two range bound watchpoints loaded in watchpoint register 18, 20.

OR gate 42 operates to define an exclusive range, receiving the outputs of comparators 32, 36 at inverted inputs. The output of a "1" at OR gate 42 indicates that the watchpoint address in watchpoint register 18 is not less than the instruction address or that the watchpoint address in watchpoint register 20 is not greater than or equal to the instruction address. The output of OR gate 42 feeds an AND gate 48, which also receives at an inverted input a Disable signal. The Disable signal indicates whether the exclusive range mode is enabled or disabled. Thus, when the Disable signal is low and one of the outputs of comparators 32, 36 is low, OR gate 42 and AND gate 48 propagate a "1."

The output of AND gate 48 feeds another AND gate 50. AND gate 50 receives as additional inputs a Range enable signal and an Exclusive Range enable signal. The Range enable signal indicates that watchpoint engine 16 is in range mode, while the Exclusive signal indicates that the range mode is exclusive. In other words, watchpoint engine 16 is in a mode in which it matches on addresses that fall outside of the range defined by the range bound watchpoints loaded into watchpoint registers 18, 20. If the Exclusive signal is high, the range signal is high, and the output of AND gate 48 is high, AND gate 50 propagates a "1" to OR gate 52.

OR gate 52 receives as inputs the outputs of the inclusive range AND gate 46, the exclusive range AND gate 50, and the direct match AND gate 38. If any of the inputs to OR gate 52 is high, it outputs a "1" to AND gate 54. The logic circuitry shown in FIG. 2 primarily operates within a first execution stage of the processor pipeline. As an illustration, that stage is indicated as the "EX1" stage. If an instruction ahead in the pipeline has been killed or stalled, that event is handled before propagating the watchpoint match determined by the logic circuitry of FIG. 2.

For this purpose, AND gate 54 includes as inputs an inverted Kill signal, an inverted Stall signal, and a Valid signal. The Kill signal indicates that an instruction in that particular pipeline stage has been killed. The Stall signal indicates that an instruction in that particular pipeline stage has been stalled. The Valid signal indicates that the current instruction is valid. If AND gate 54 receives indication of a match from OR gate 52 in combination with an indication of not killed, not stalled, and valid, it propagates a "1" to the next stage of watchpoint engine 16. Otherwise, AND gate 54 produces a "0."

The "1" that is output by AND gate 54 indicates that there was either an inclusive range match, an exclusive range match, or a direct match, depending on whatever watchpoint mode is applicable to watchpoint engine 16 at the time. The inclusive and exclusive range matches detected by AND gate 54 are made relative to the watchpoint addresses loaded in watchpoint registers 18, 20. The direct match detected by AND gate 54 is made relative to the watchpoint address loaded in watchpoint register 18.

An AND gate 56 similar to AND gate 54 is provided to detect and indicate direct matches on the watchpoint address loaded into watchpoint register 20. AND gate 56 receives as inputs the output of AND gate 44, the inverted Kill signal, the inverted Stall signal, and the Valid signal. If the output of AND gate 44 is high, and AND gate 54 receives the not killed, not stalled, and valid signals, it propagates a "1" to the next stage of watchpoint engine 16. In this manner, AND gate 54 indicates a direct address match on the watchpoint address loaded into watchpoint register 20.

Figure 3:
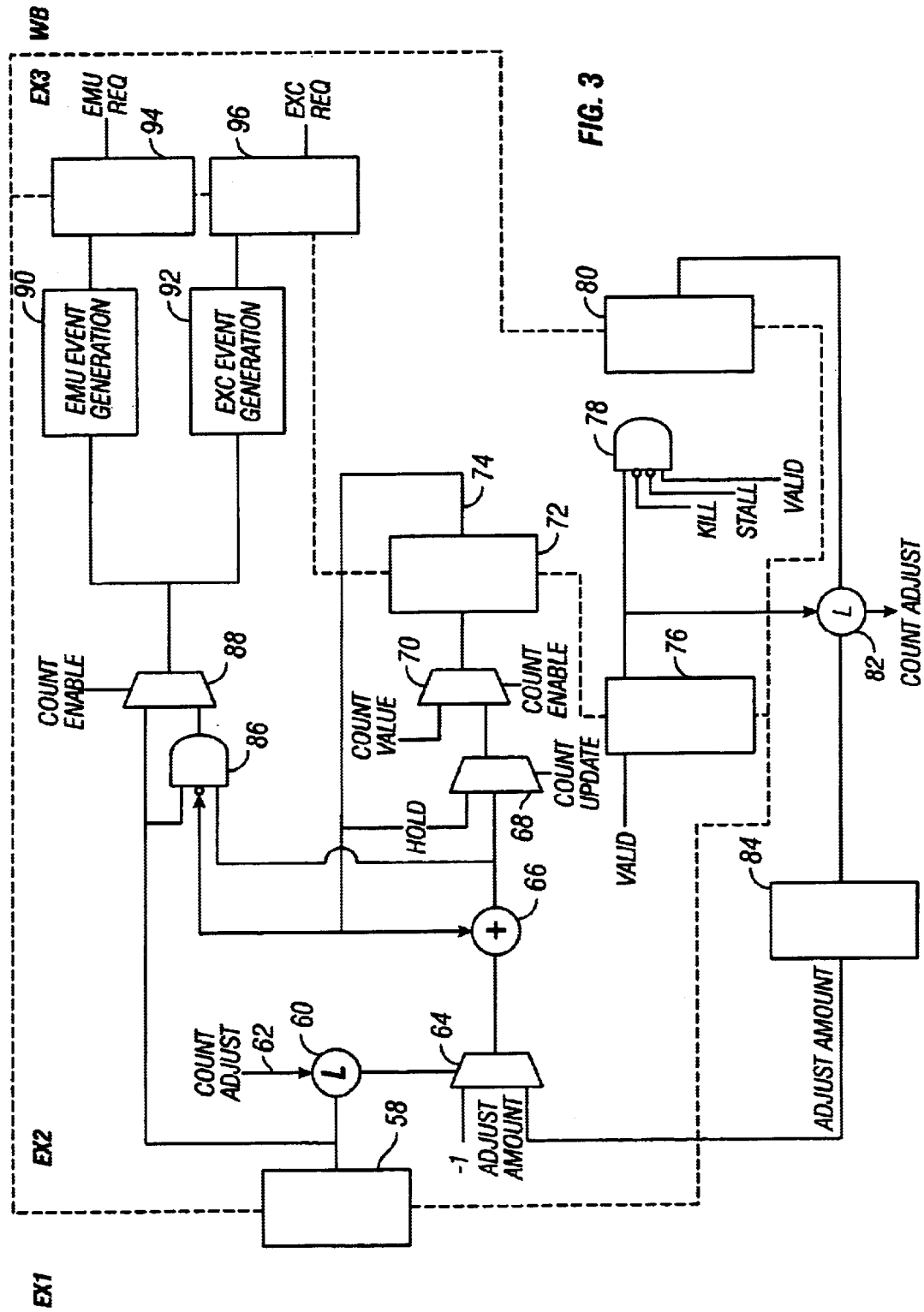
FIG. 3 is a circuit diagram illustrating additional circuitry suitable for implementation of a watchpoint engine.

FIG. 3 is a schematic diagram illustrating additional circuitry for generating watchpoints. The circuitry of FIG. 3 represents the next stage of watchpoint engine 16 following the stage illustrated in FIG. 2, and spans second (EX2), third (EX3), and writeback (WB) stages of the processor pipeline, as indicated by the dashed boundaries in FIG. 3. In the example of FIG. 3, a register 58, e.g., a flip-flop, holds the output of AND gate 54 of FIG. 2. Circuitry substantially similar to that shown in FIG. 3 may be provided for processing of the output of AND gate 56 of FIG. 2.

One important aspect of the circuitry of FIG. 3 is dynamic counter logic that permits precise handling of exceptions within the processor pipeline execution stages. If a watchpoint match is propagated to EX2, for example, but an instruction ahead in the pipeline in EX3 is killed, watchpoint engine 16 readjusts a counter to compensate for the killed instruction that matched on the watchpoint address. For that purpose, the output of register 58 feeds both a counter circuit and watchpoint logic. In particular, register 58 feeds a counter logic circuit 60, which acts as a counter controller and receives as an additional input a count adjustment signal, as indicated by reference numeral 62.

Counter logic circuit 60 controls multiplexer 64 to select either a −1 or a counter adjustment amount that is fed to an adder 66. Adder 66 serves to increment or decrement a counter value produced by a series of multiplexers 68, 70 and a count register 72. Decrementing by 1, i.e., adding by −1, is the ordinary operation when a particular event being counted is detected. The counter is provided to enable the counting of successive occurrences of a particular watchpoint before triggering an emulation or exception event handler. Notably, occurrences of watchpoint matches detected in the EX1 stage are counted in a later stage, i.e., in the EX2 stage.

The output of count register 72 is fed back to adder 66, as indicated by reference numeral 74, and to one of the inputs of multiplexer 68. Multiplexer 68 receives the output of adder 66 as its other input. Multiplexer 70 is provided for loading of a desired count value. Multiplexer 70 is responsive to a Count Enable signal to select either the count value produced by multiplexer 68 or an initial count value loaded into memory by the application developer. In other words, multiplexer 70 permits the entry of an initial count value representing the number of times an event should be detected before generating an event trigger. In operation, that initial count value is decremented by adder 66.

A Count Update signal indicates whether multiplexer 68 should select the output of adder 66 or the output of register 72. Thus, the Count Update signal indicates whether the count value should be updated or held. If the output of adder 66 is selected by multiplexer 68, the existing counter value is decremented or incremented, depending on the output of multiplexer 64, which is applied to the adder. If the output of register 72 is selected by multiplexer 68, the existing counter value is held, rather than incremented or decremented.

The counter circuitry tracks a desired number of occurrences of a particular event, e.g., direct match or range match. If an instruction produced a watchpoint address match and resulted in a decrement to the counter, but is killed in the EX3 stage, the counter value is incremented by 1 rather than decremented to compensate for the fact that the matched instruction was counted but subsequently killed. If an instruction produced a watchpoint address match and resulted in a decrement to the counter, but is killed in the writeback stage, the counter value is incremented by one rather than decremented. If an instructions that produce a watchpoint address match are killed in the EX3 and writeback stages, that counter value is incremented by two rather than decremented. The logic for determining the amount by which the count value should be adjusted is provided by register 76, AND gate 78, register 80, logic circuit 82, and register 84.

Register 76 receives an input, from AND gate 75, that indicates whether a valid match has been detected in the EX2 stage. A valid match means that the pertinent instruction that produced a watchpoint address match was valid, not killed, and not stalled in the present pipeline stage. The output of register 76 feeds AND gate 78 and logic circuit 82. AND gate 78 also receives as inputs an indication of whether the matched instruction is not killed, not stalled, and valid in the EX3 stage. The not killed, not stalled, and valid signals are logically different signals for each pipeline stage. If there is a match and the matched instruction is not killed, not stalled, and valid in the EX3 stage, the output of AND gate 78 is fed to a register 80, which outputs a value in the writeback (WB) stage.

The output of register 80 is fed to logic circuit 82 along with the output of register 76. Logic circuit 82, in turn, produces a counter adjustment amount and drives the input of register 84. The output of register 76 indicates whether an instruction was killed, stalled, or not valid in the EX3 stage. The output of register 80 indicates whether an instruction was killed, stalled, or not valid in the writeback stage. On the basis of those inputs, logic circuit 82 produces the counter adjustment amounts described above, i.e., 1 or 2, and compensates for the decrementing operation. Register 84 provides the counter adjustment amount to multiplexer 64. When a counter adjustment is necessary, logic circuit 82 also generates the Count Adjust signal that is applied to multiplexer 64 as a control signal to select the counter adjustment amount produced by register 84 rather than the −1 or 0 inputs to multiplexer 64. The Count Adjust signal may simply indicate whether an instruction was killed in EX3 or Writeback.

Logic circuit 82 generates a counter adjustment amount in response to the killing of matched instructions in later execution stages of the pipeline. In this manner, a counter value that tracks the number of occurrences of a particular match can be compensated for matches that are counted but later killed. The output of logic circuit 82 tracks essentially two conditions and the combinations of those conditions.

The first condition exists when an instruction that produced a watchpoint address match has been killed in the EX3 stage. The second condition exists when an instruction that produced a watchpoint address match has been killed in the writeback stage. In some cases, both conditions may exist. Logic circuit 82 identifies the conditions based on the output of register 76 and register 80. The output of register 76 indicates a valid match in the EX3 stage, while the output of register 80 indicates whether an instruction has been killed or stalled in the writeback stage.

For existence of the first condition, but not the second, logic circuit 82 generates as the counter adjustment amount the value of "1." In this way, adder 66 sums the existing counter value with "1," compensating for a killed instruction one stage ahead in the pipeline. If there is a killed instruction at both stages (EX3 and WB), but no watchpoint address match in those stages, a zero is added to the counter.

For existence of the second condition, but not the first, logic circuit 82 generates as the counter adjustment amount the value of "1." In this way, adder 66 sums the existing counter value with "1," and increments the counter value instead of decrementing it, compensating for a killed instruction in the WB stage.

For existence of both the first and second condition, logic circuit 82 generates as the counter adjustment amount the value of "2." In this way, adder 66 sums the existing counter value with "2," and increments the counter value by "2" instead of decrementing it, compensating for killed instructions, that produced watchpoint address matches, in the EX3 stage and the subsequent Writeback (WB) stage.

An AND gate 86 receives the output of register 58, the most significant bit of adder 66, and, at an inverted input, the most significant bit output of register 72. AND gate 86 tracks whether the counter has rolled over, as a condition for generation of an EMU or EXC event, and therefore only requires inspection of the most significant bits of register 72 and adder 66. The output of register 58 and the output of AND gate 86 are received by a multiplexer 88. When the output of register 58 indicates a watchpoint match, the present counter value in register 72 has been decremented to "1," and the output of adder 66 is a "1" (indicating no count adjustment on the present cycle), AND gate 86 outputs a "1" to multiplexer 88.

A count enable signal may indicate whether the developer has specified a number of occurrences for a watchpoint or whether a single occurrence is sufficient for event triggering. In this manner, the count enable signal may indicate whether multiplexer 88 should select the output of register 58 or the output of AND gate 86 and, therefore, whether to trigger on the first occurrence or the nth occurrence, respectively. Multiplexer 88 thereby may form part of a trigger circuit that specifies the number of occurrences for a watchpoint.

The output of multiplexer 88 may drive an emulation (EMU) event generation circuit 90 and an exception (EXC) event generation circuit 92. EMU generation circuit 90 drives a register 94 that generates an emulation request (EMU REQ) in the EX3 stage of the pipeline. EXC generation circuit 92 drives a register 96 that generates an exception request (EXC REQ) in the EX3 stage of the pipeline. EMU and EXC generation circuits 90, 92 are discussed in greater detail below with reference to FIG. 4.

An emulation event causes processor 12 to enter emulation mode. In emulation mode, instructions can be read from a JTAG interface provided in integrated circuit device 10. The JTAG interface is defined by IEEE Standard 1149.1 (IEEE Std. 1149.1-1990, published 1990, and entitled "Test Access Port and Boundary-Scan Architecture"). When an emulation event occurs, the type of emulation event, e.g., watchpoint match, is recorded in a status register. Optionally, a watchpoint match can cause processor 12 to issue an exception rather than an emulation event. For an exception event, processor 12 traps to an exception handler. Configuration bits can be set in the watchpoint instruction address control register and the watchpoint data address control register to specify whether a particular event should generate emulation events or exception events.

Figure 4:
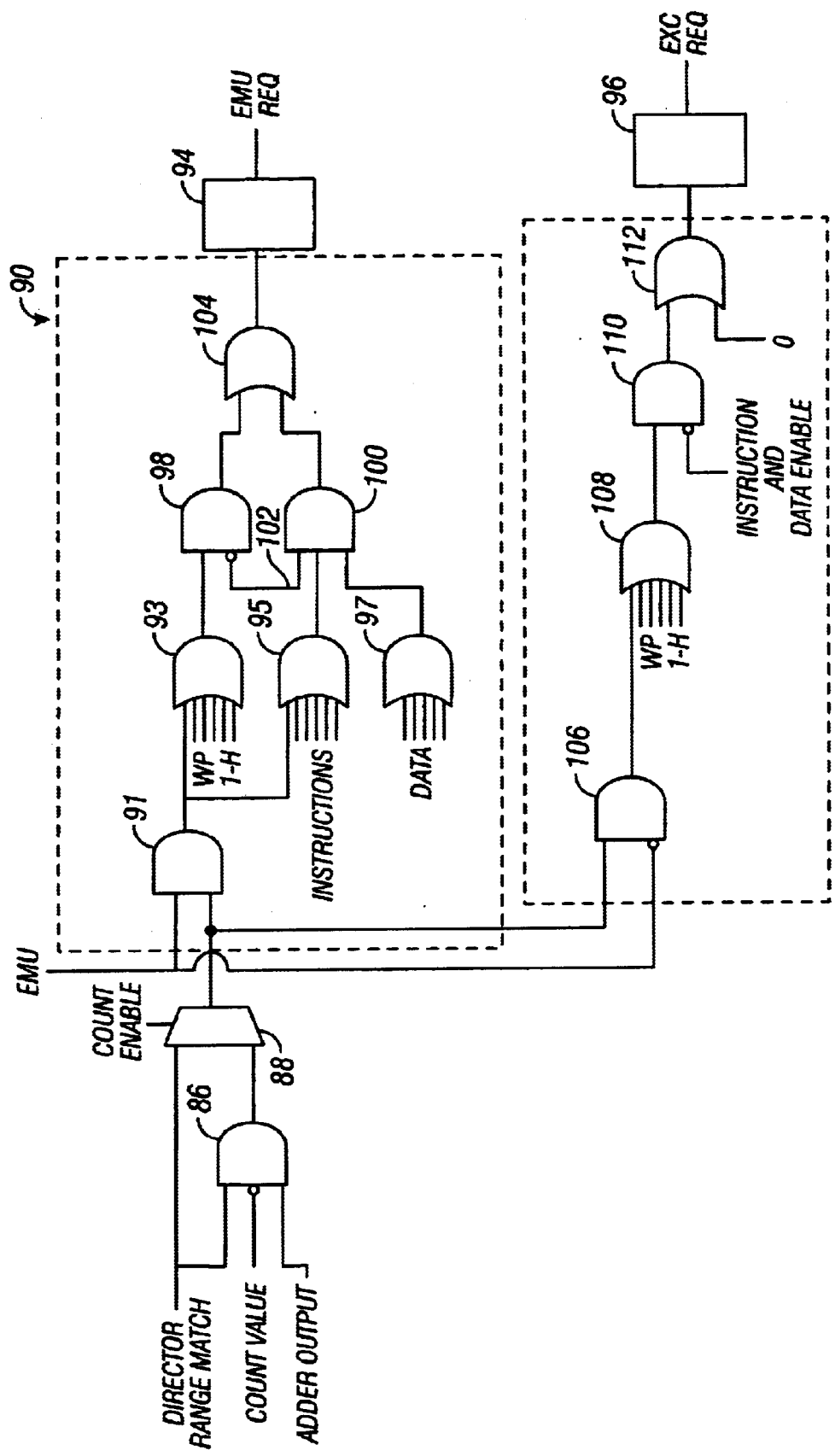
FIG. 4 is another circuit diagram illustrating additional circuitry suitable for implementation of a watchpoint engine.

FIG. 4 is another circuit diagram illustrating additional circuitry suitable for implementation of a watchpoint engine. In particular, FIG. 4 illustrates EMU event generation circuit 90 and EXC event generation circuit 92 in greater detail. AND gate 86 and multiplexer 88 from FIG. 3 are also illustrated in FIG. 4. As shown in FIG. 4, EMU event generation circuit 90 may include an AND gate 91 that receives as inputs an EMU enable signal and the output of multiplexer 88, which indicates the identification of a watchpoint event. The EMU enable signal indicates that the type of desired event is emulation. The output of AND gate 91 drives OR gates 93 and 95.

Integrated circuit device 10 may include multiple pairs of watchpoint comparators, such as that shown in FIG. 2. In addition to the output of AND gate 91, OR gate 93 receives the outputs for all of the watchpoint engines. OR gate 95 receives, in addition to the output of AND gate 91, an indication of all watchpoint address matches for instructions, as generated by the various watchpoint engine comparator pairs. An additional OR gate 97 receives an indication of all watchpoint address matches for data, as generated by the various watchpoint engine comparator pairs. Thus, OR gates 93, 95, 97 monitor the outputs of all watchpoint engines in integrated circuit device 10 for an indication of a watchpoint address match. In general, data matches only lead to generation of EMU events.

An AND gate 98 receives the output of gate 93 at one input and, at an inverted input, an instruction and data match enable signal, indicated by reference numeral 102. If the instruction and data match enable signal is high, then AND gate 98 is, in effect, disabled, and produce a low output. AND gate 100, however, produces a high output if OR gate 95 and OR gate 97 are both high and therefore indicate both an instruction match and a data match on the same cycle. Thus, the instruction and data match enable signal places device 10 in a mode in which EMU events are only generated when there are both an instruction match and a data match. If the instruction and data match enable signal is low, then any watchpoint address match, as indicated by the output of OR gate 93 is sufficient for generation of an EMU event. In effect, EMU generation circuit 90 determines a) whether the integrated circuit device is in emulation mode, and (b) whether there are any data or instruction matches.

Again, if the instruction and data match enable signal is high, the output of OR gate 93 is ignored, while the outputs of OR gates 95, 97 drive AND gate 100 high in the event they are both high. If the instruction and data match enable signal is low, only the output of OR gate 93 is considered. In either case, if the pertinent output, i.e., from AND gate 98 or 100 is high, gate 104 goes high to generate an emulation request.

For exception generation circuit 92, the EMU enable signal and the output of multiplexer 88 provide the inputs to an AND gate 106. The EMU enable signal is received at an inverted input of AND gate 106. The output of multiplexer 88 is indicative of the watchpoint match status for one of the watchpoint comparator pairs, and thus is one of many inputs to EXC event generation circuit 92. AND gate 106 drives one of the inputs of an OR gate 108. The other inputs to OR gate 108 are the various instruction and data watchpoint matches produced by the other watchpoint comparator pairs that may be provided in integrated circuit device 10. The output of OR gate 108 is fed to register 96. If the output of gate 108 indicates an exception match, register 96 may output a "1" that drives the generation of an exception request.

Figure 5:
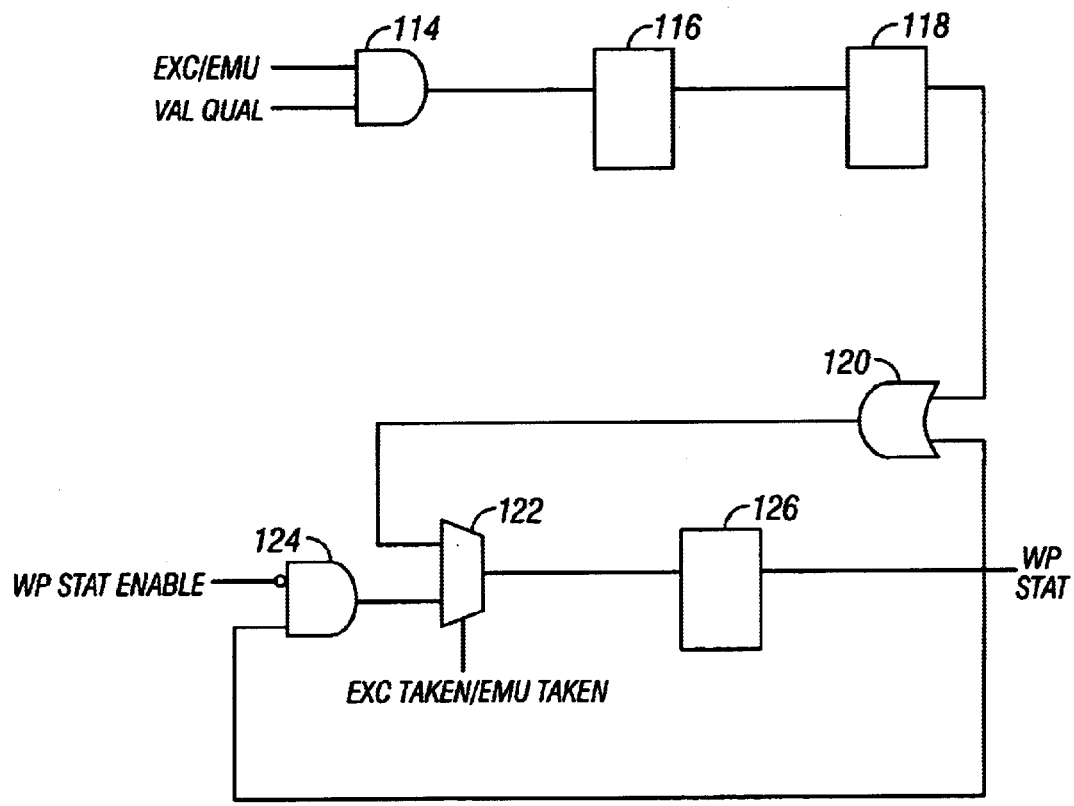
FIG. 5 is another circuit diagram illustrating additional circuitry suitable for implementation of a watchpoint engine.

FIG. 5 is another circuit diagram illustrating additional circuitry suitable for implementation of a watchpoint engine.

In particular, FIG. 5 illustrates the maintenance of a watchpoint status register ("WP Stat"). The watchpoint status register WP Stat monitors the status of watchpoints. This register may be updated on every clock cycle. When a watchpoint or watchpoint range matches, the WP Stat register latches the source of the watchpoint. This permits identification of which watchpoints and sources matched.

As shown in FIG. 5, an AND gate 114 receives either an indication of an exception or emulation event and an indication that the event is valid and not killed and not stalled in the pertinent stage. The output of AND gate 114 drives two flip-flops 116, 118. An intermediate AND gate 117 determines whether the matched instruction in EX3 is not killed, not stalled, and valid. The output of flop 118 drives one input of an OR gate 120. In the event the output of flop 118 or the WP Stat contents is high, the output of OR gate 120 is high.

A multiplexer 122 receives as inputs the output of OR gate 120 and the output of an AND gate 124. AND gate 124 receives as inputs the WP Stat contents and, at an inverted input, a WP Stat Clear signal. The WP Stat Clear signal indicates whether the WP Stat values should be set to zero. If so, the output of AND gate 124 is low. Multiplexer 122 is controlled by an EXC Taken/EMU Taken control line. If an EXC or EMU event is to be taken, multiplexer 122 selects the output of OR gate 120. If an EXC or EMU event is not to be taken, multiplexer 122 selects the output of AND gate 124. Multiplexer 122 drives register 126, which represents the contents of the WP Stat register.

Figure 6:
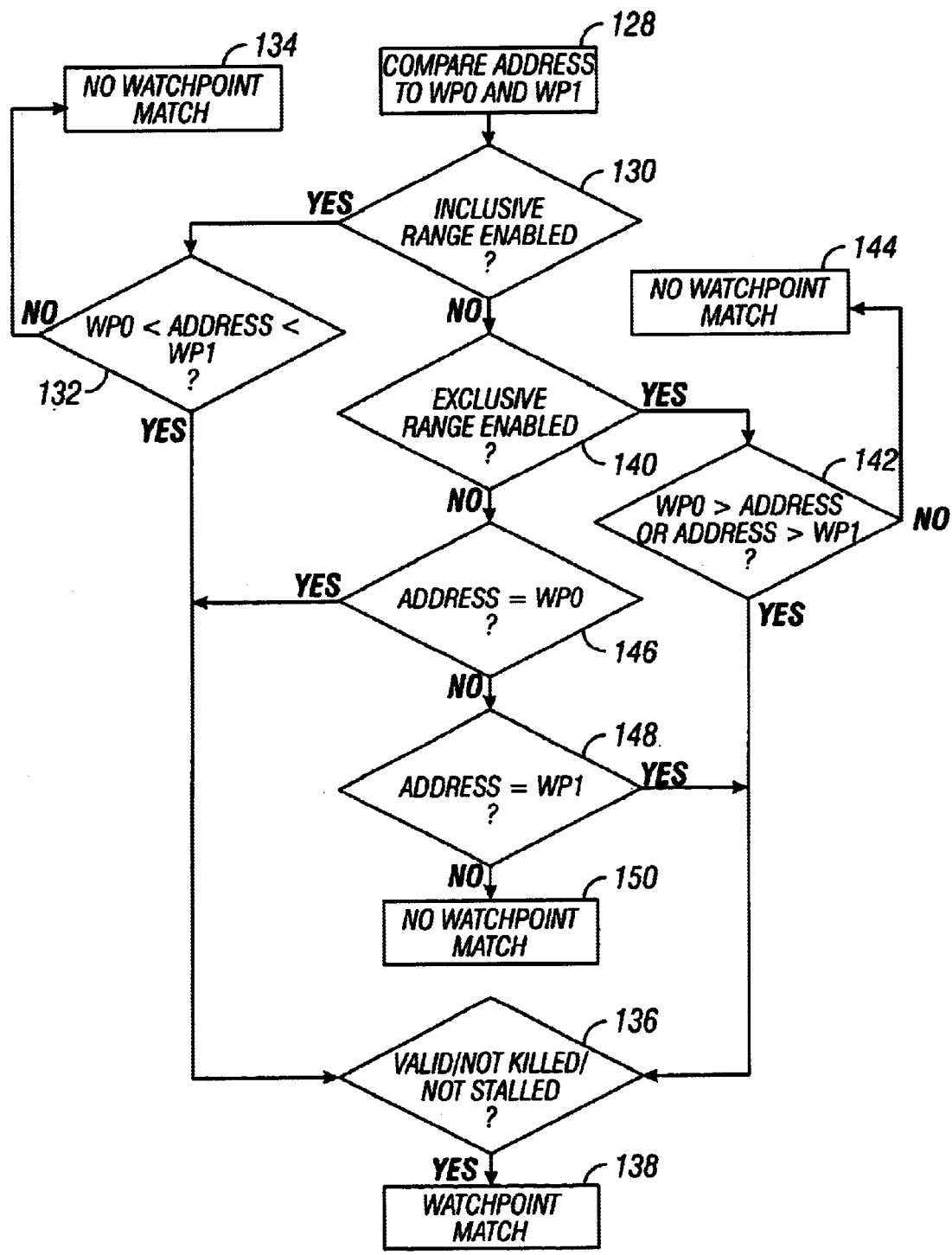
FIG. 6 is a flow diagram illustrating generation of watchpoint matches.

FIG. 6 is a flow diagram illustrating generation of watchpoint matches. Upon comparison a current instruction or data address to first and second watchpoint address WP0 and WP1 (128), the process determines whether the inclusive range is enabled (130). If so, the process determines whether the address is greater than the first watchpoint address WP0 and less than (or less than or equal to) the second watchpoint address WP1 (132). If not, it is determined that there is no watchpoint match (134). If so, the process determines whether the pertinent instructions is valid, not killed, and not stalled in the present pipeline stage (136). If so, a watchpoint match is generated (138.)

If the inclusive range is not enabled, the process determines whether the exclusive range is enabled (140). If so, the process determines whether the first watchpoint WP0 is greater than the address or whether the address is greater than (or greater than or equal to) the second watchpoint WP1 (142). If either is true, the process determines whether the pertinent instruction is valid, not killed, and not stalled (136). If so, a watchpoint match is indicated (138). If neither condition (142) is true, there is not watchpoint match 144.

If neither the inclusive range (130) nor exclusive range (140) is enabled, direct matches with watchpoints WP0 and WP1 are considered (146, 148). If neither produces a direct watchpoint match, that indication is made (150). If either watchpoint WP0, WP1 produces a direct match, the process determines whether the pertinent instruction is valid, not killed, and not stalled (136). If this condition is true, the process identifies a watchpoint match (138).

Various embodiments of the invention have been described. These and other embodiments are within the scope of the following claims.

What is claimed is:

1. An apparatus comprising:
   a watchpoint register adapted to store a watchpoint address;
   a comparator to compare the watchpoint address to program addresses associated with instructions submitted in a first stage of a processor pipeline;
   a watchpoint generator to generate a watchpoint match when a program address equals the watchpoint address, wherein the watchpoint register includes a first watchpoint register to be loaded with a first watchpoint address, and a second watchpoint register to be loaded with a second watchpoint address, the comparator being configured to compare the first and second watchpoint addresses to program addresses associated with instructions to be submitted to the processor pipeline, and the watchpoint generator being configured to generate a watchpoint match when the program address is to be in a range defined by the first and second watchpoint addresses;
   a counter to generate a count value in a second stage of the processor pipeline, the count value to represent the number of watchpoint matches;
   a trigger circuit to trigger a request when the count value exceeds a trigger threshold; and
   a controller to adjust the count value when one of the instructions associated with one of the watchpoint matches is to be killed or stalled at a later stage in the pipeline, wherein the range is to be an inclusive range that is to extend between the first and second watchpoint addresses, or an exclusive range outside a range that is to extend between the first and second watchpoint addresses.

2. The apparatus of claim 1, further comprising event generation circuitry to selectively generate either an emulation event handling request or an exception handling request based on a predetermined event type associated with the watchpoint match.

3. The apparatus of claim 1, further comprising circuitry to selectively disable one of the watchpoint registers to conserve power.

4. The apparatus of claim 1, wherein the comparator includes a first comparator to compare the first watchpoint address to the program addresses, and a second comparator to compare the second watchpoint address to the program addresses, the watchpoint engine further comprising circuitry to selectively disable at least one of the first and second comparators and to stabilize the output of the disabled comparator.

5. A method comprising:
   comparing a watchpoint address to a program address associated with instructions submitted in a first stage of a processor pipeline;
   generating a watchpoint match when a program address equals the watchpoint address; and
   generating a count value in a second stage of the processor pipeline representing the number of watchpoint matches;
   generating a request when the count value exceeds a trigger threshold;
   adjusting the count value when one of the instructions associated with one of the watchpoint matches is killed or stalled at a later stage an the pipeline;
   specifying first and second watchpoint addresses in first and second watchpoint registers;
   comparing the first and second watchpoint addresses to program addresses associated with instructions submitted to a processor pipeline;
   generating a watchpoint match when the program address is in a range defined by the first and second watchpoint addresses; and
   generating the watchpoint match when the program address is in an inclusive range extending between the first and second watchpoint addresses, or an exclusive range outside a range extending between the first and second watchpoint address.

6. The method of claim 5, further comprising selectively generating either an emulation event handling request or an exception handling request based on a predetermined event type associated with the watchpoint match.

7. The method of claim 5, further comprising selectively disabling one of the first and second watchpoint registers to conserve power.

8. A system comprising:

a flash memory device;

a pipelined processor to couple to the flash memory device;

a first watchpoint register adapted to store a first watchpoint address;

a second watchpoint register adapted to store a second watchpoint address;

a comparator to compare the first and second watchpoint address to program addresses associated with instructions submitted to a processor pipeline;

a watchpoint generator to generate a watchpoint match when the program address is to be in a range defined by the first and second watchpoint addresses, wherein the range is to be an inclusive range that is to extend between the first and second watchpoint addresses, or an exclusive range outside a range that is to extend between the first and second watchpoint address;

a counter to generate a count value to represent the number of watchpoint matches to be generated by the watchpoint generator;

a trigger circuit to trigger a request when the count value is to exceed a trigger threshold, wherein the request is an emulation event handling request or an exception handling request; and a controller to adjust the count value when one of the instructions associated with one of the watchpoint matches is to be killed or stalled at a later execution stage in the pipeline.

* * * * *